(No Model.)

J. A. MORRELL.
PROCESS OF CONCENTRATING SOLUTIONS.

No. 441,317. Patented Nov. 25, 1890.

UNITED STATES PATENT OFFICE.

JAMES A. MORRELL, OF LANSDALE, ASSIGNOR OF ONE-HALF TO GIDEON W. MARSH, OF PHILADELPHIA, PENNSYLVANIA.

PROCESS OF CONCENTRATING SOLUTIONS.

SPECIFICATION forming part of Letters Patent No. 441,317, dated November 25, 1890.

Application filed December 13, 1888. Serial No. 293,533. (No specimens.)

*To all whom it may concern:*

Be it known that I, JAMES A. MORRELL, a citizen of the United States, residing at Lansdale, in the county of Montgomery and State of Pennsylvania, have invented a certain new and useful Improved Process of Concentrating Solutions and Evaporating Liquids; and I do hereby declare the following to be a sufficiently full, clear, and exact description thereof as to enable others skilled in the art to make and use the said invention.

This invention relates to the concentration of solutions or liquids, and has for its object the expeditious evaporation thereof; and it consists in a new method or process of producing evaporation without exposing the fluid for any considerable period of time to the action of the atmosphere, in the manner hereinafter described.

An apparatus for conducting this process is shown in the accompanying drawings, in which—

Figure 1:
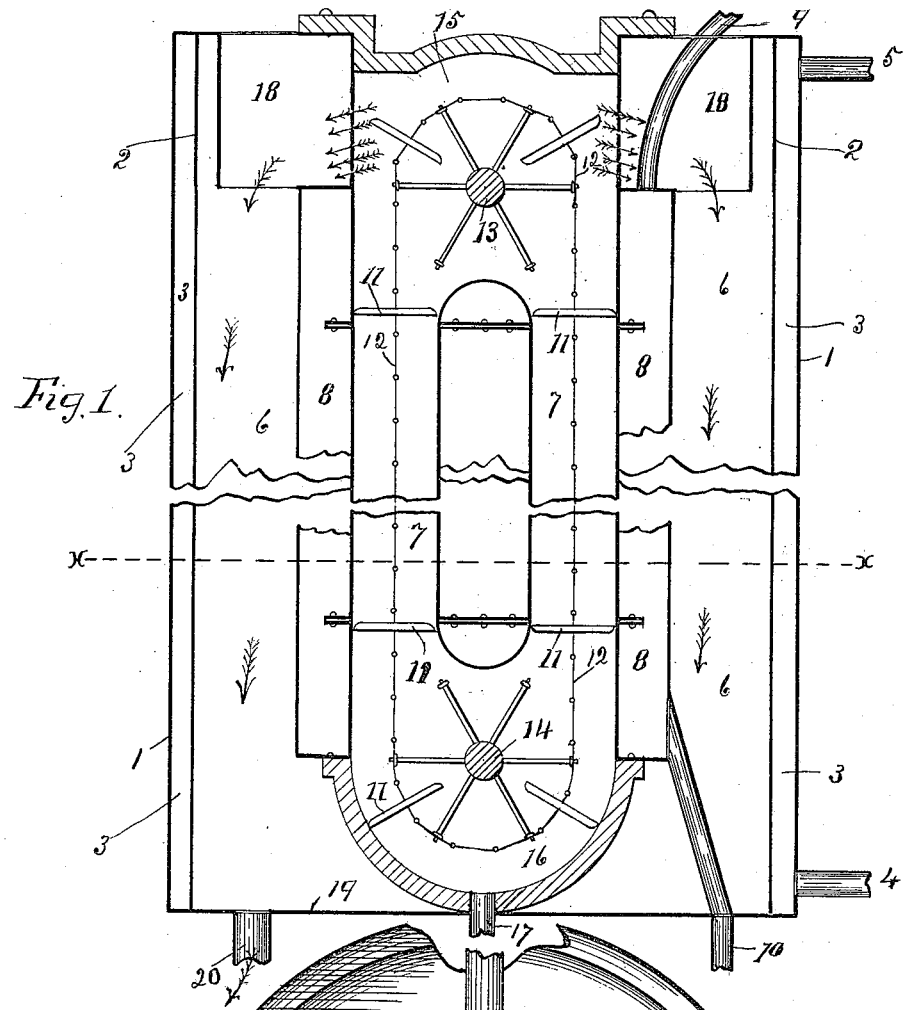
Figure 2:
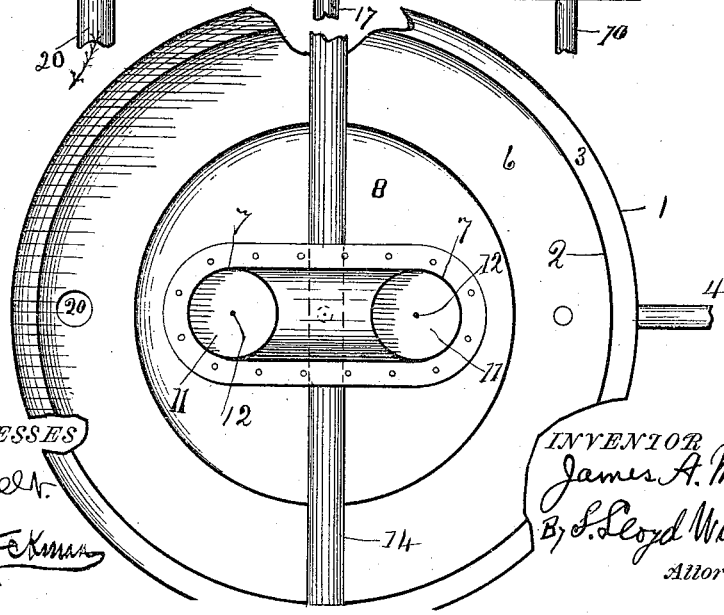

Figure 1 shows a vertical section, and Fig. 2 a sectional view taken on the line $xx$, Fig. 1.

The same reference-marks indicate the same parts in both figures.

1 represents an outer casing; 2, a lining secured fluid-tight within it, leaving a space or steam-chamber 3, which is supplied with a circulation of superheated steam or other heated fluid by pipe 5.

A pipe 4 is provided near the bottom of the chamber 3 for the withdrawal of water of condensation.

6 is the evaporating-chamber, open at its top, which is kept constantly at a high temperature.

7 are two parallel pipes surrounded by a steam-chamber 8, also heated by superheated steam supplied by pipe 9. A similar pipe 10 is connected with the chamber 8 for the withdrawal of water of condensation.

Within the pipe 7 are fitted scrapers 11, fitting closely to the internal surfaces of the said pipes so as to scrape them. The scrapers 11 are secured upon an endless chain 12, which passes around and is moved by sprocket-wheels 13 and 14, located in the upper and lower connections 15 and 16 of the pipes 7. These connections 15 and 16 are made fluid-tight, so as to retain fluid to be concentrated introduced into them and the pipes 7 under pressure by the pipe 17.

Minute apertures are made in the walls of the upper connection 15, through which fluid at high temperature is sprayed against the screen 18, from which it is dispersed in spray into the chamber 6, where it requires further heating, and, parting with the moisture, becomes thicker and is precipitated to the base 19 of the chamber 6, and is withdrawn through the pipe 20. During the passage of the fluid through this apparatus the scrapers 11 are kept in constant motion, so that they move and agitate the fluid, and the internal surfaces of the pipes 7 are scraped and kept in effective heat-conducting condition.

By means of the scraping action, in conjunction with the pressure upon the solution, I am enabled to apply greater heat without coagulating the solution to such a point as to prevent the spraying or atomizing of it in the superheating-chamber.

My process is easily accomplished, by means of the apparatus hereinbefore described, in the following manner: The liquid to be treated is introduced under pressure into the pipes 7 by the pipe 17, and is moved and agitated therein by the motion of the scrapers 11. It is also heated therein while thus being moved, and is then sprayed against a screen 18, from which it is precipitated into the chamber 6, where it is further heated, and from whence the concentrated solution is removed through the pipe 20.

Having described this invention, what I claim is—

The herein-described process of concentrating solutions, consisting in mechanically agitating and moving the solution under pressure while being heated beyond its normal temperature of ebullition, spraying it against a screen, whereby it is precipitated from the said screen in an atomized or minutely-divided condition, and allowing it to pass while in this condition through a heated chamber, and finally collecting the concentrated solution from such chamber, substantially as described.

JAMES A. MORRELL.

Witnesses:
LUTHER L. CHENEY,
H. B. S. MORRELL.